United States Patent [19]

Milburn, Jr.

[11] Patent Number: 4,597,403

[45] Date of Patent: Jul. 1, 1986

[54] NUTATION VALVING APPARATUS AND METHOD OF OPERATION

[76] Inventor: William W. Milburn, Jr., 945 Ninth St., Boulder, Colo. 80302

[21] Appl. No.: 474,829

[22] Filed: Mar. 14, 1983

[51] Int. Cl.[4] ..................... F02B 59/00; F16K 31/524

[52] U.S. Cl. .......................................... 137/1; 91/173; 92/177; 123/42; 123/47 R; 123/63; 137/625.2; 417/466; 418/61 R; 251/251

[58] Field of Search ................. 251/251; 137/1, 625.2; 123/42, 45 R, 47 R, 50 R, 53 R, 61 R, 63; 91/173; 92/177 R; 418/61 R; 417/466

[56] References Cited

U.S. PATENT DOCUMENTS

| | | | |
|---|---|---|---|
| 1,734,433 | 11/1929 | Hoyt . | |
| 3,063,429 | 11/1962 | Niemann | 121/68 |
| 3,211,107 | 10/1965 | Bush | 417/466 |
| 3,511,584 | 5/1970 | Vierling | 418/61 R |
| 3,567,349 | 3/1971 | Meulendyk | 418/61 R |
| 3,873,248 | 3/1975 | Johnson | 137/625.2 |
| 3,951,112 | 4/1976 | Hunter | 418/61 R |
| 3,974,803 | 8/1976 | Lassota | 123/42 |
| 4,005,951 | 2/1977 | Swinkels | 418/61 R |
| 4,010,675 | 3/1977 | Lassota | 123/42 |
| 4,097,205 | 6/1978 | Miles | 418/61 R |
| 4,160,628 | 7/1979 | Ruoff | 417/466 |
| 4,325,331 | 4/1982 | Erickson | 123/42 |
| 4,437,437 | 3/1984 | Erickson | 123/42 |

FOREIGN PATENT DOCUMENTS

| | | | |
|---|---|---|---|
| 474336 | 6/1972 | Australia | 418/61 R |

*Primary Examiner*—G. L. Walton

*Attorney, Agent, or Firm*—O'Rourke & Harris

[57] ABSTRACT

Structure and method for providing timed valving in which a nutating plate having an opening defined therethrough moves relative to at least one other nominally static plate having a complementary opening defined therethrough, the nutating plate at one portion of the nutating travel bringing the opening defined thereto in alignment with the complementary static opening and in another portion of the nutating movement positioning such opening therethrough in a spaced, sealing relationship relative to the complementary static opening. Either the nutating or nominally static plate may be utilized in pairs such that a sandwiched relationship between one type of plate and the other exists. The static and nutating plates may advantageously be biased together. Timing of the opening and closing of the valving structure may be adjusted relative to a nominal rotating shaft such as to provide opening and closing cycles of selected portions of an entire rotation.

12 Claims, 22 Drawing Figures

NUTATION VALVING APPARATUS AND METHOD OF OPERATION

BACKGROUND OF THE INVENTION

1. Field of the Invention

This invention relates generally to valving mechanisms for operation and timed relationships to another moving structure, such as reciprocating or rotating pumps, compressor heat engines, etc., and more particularly to a nutating valving arrangement in which one plate member moves in nutating relationship to at least one other static plate member such that openings defined through each of the plate members come into alignment for selected portions of the nominal cycle.

2. Description of the Prior Art

Numerous valving arrangements for timed operation relative to, for instance, a rotating shaft are known. For purposes of convenience, discussion of such arrangements with reference to a reciprocating piston device will be addressed.

Perhaps the most common timed valve mechanism is a poppet valve in which a tulip valve reciprocates in timed relationship to rotation of a shaft, usually by a cam shaft driven by an associated crank shaft. Though widely accepted, the poppet valve suffers several problems. A reciprocating motion with accompanying acceleration forces limits speed of operation and at high speed tends to induce wear of the valve and seat. Also, even when opened, the poppet valve obstructs to a substantial extent the opening and thus restricts flow.

Another simpler valving arrangement is that of a piston timed port in which a simple opening is defined, for instance, in a cylinder wall in communication with a port such that a reciprocating piston in the cylinder will open and close the port as a piston travels thereby. In addition to wear problems resulting from the rapidly moving piston, or more after piston rings, travelling over the opening, such arrangement is inappropriate for use in the ubiquitous four stroke Otto-cycle engine in that the timing of such device usually causes a valve to open on the upstroke of the piston to remain open through a complete downstroke and somewhat into the following upstroke. Thus, a valving device that opens at a fixed position in each stroke is clearly inappropriate and inflexible.

Rotary valves in which, in the common instance, a fixed cylinder having an opening defined therethrough is contained in or contains a rotating cylinder having a complementary opening therethrough such that as the rotating cylinder passes through an aligned arrangement between the opening therein and the fixed cylinder opening flow occurs, has certain apparent advantages. Reciprocating parts are avoided. However, because of the extensive travel between various portions of the valving mechanism, wear and accordingly sealing shortcomings have often developed when such rotary valves are used. In a related arrangement, a disc rotating adjacent in opening again involves substantial surface to surface wear as the disc rotates through each valve cycle.

An unusual valving mechanism is described in U.S. Pat. No. 4,325,331 issued April 20, 1982 to Frederick L. Erickson. As particularly well shown in FIGS. 30 through 32, a combination of edge surfaces of a reciprocating piston and orbiting piston are used to effect a variation of the above described piston timed port arrangement, such configurations clearly are restricted to timing rate, duration and/or location of the parts.

Numerous other valving arrangements have been proposed, but usually with the disadvantages or combinations of disadvantages discussed above resulting from reciprocating or rotary movement between the different valve components.

SUMMARY OF THE INVENTION

The present invention, which provides a heretofore unavailable advantage and utility in providing for timed valving cycles comprises a nutating movement between a minimum of two plate components each of which has an orifice defined therein. The orifices align during one portion of the nutating movement and are positioned in a sealed, spaced relationship in another portion of the nutating movement. Such arrangement affords great economy of movement between the plates thus minimizing wear and prolonging the sealing relationship between the plates. Wear may be accomodated by urging the plates together. Further, the timing of the valving structure may be adjusted to permit design variations in timing, or if desired, a dynamic variation during operation. Porting may be located for ease of manufacture and/or enhanced flow characteristics. Thus a simple and readily produced structure which permits straight forward and flexible valving is provided while avoiding the problems of reciprocating or rotating valving structures heretofore common.

DETAILED DESCRIPTION OF THE INVENTION

Figures 1, 2:
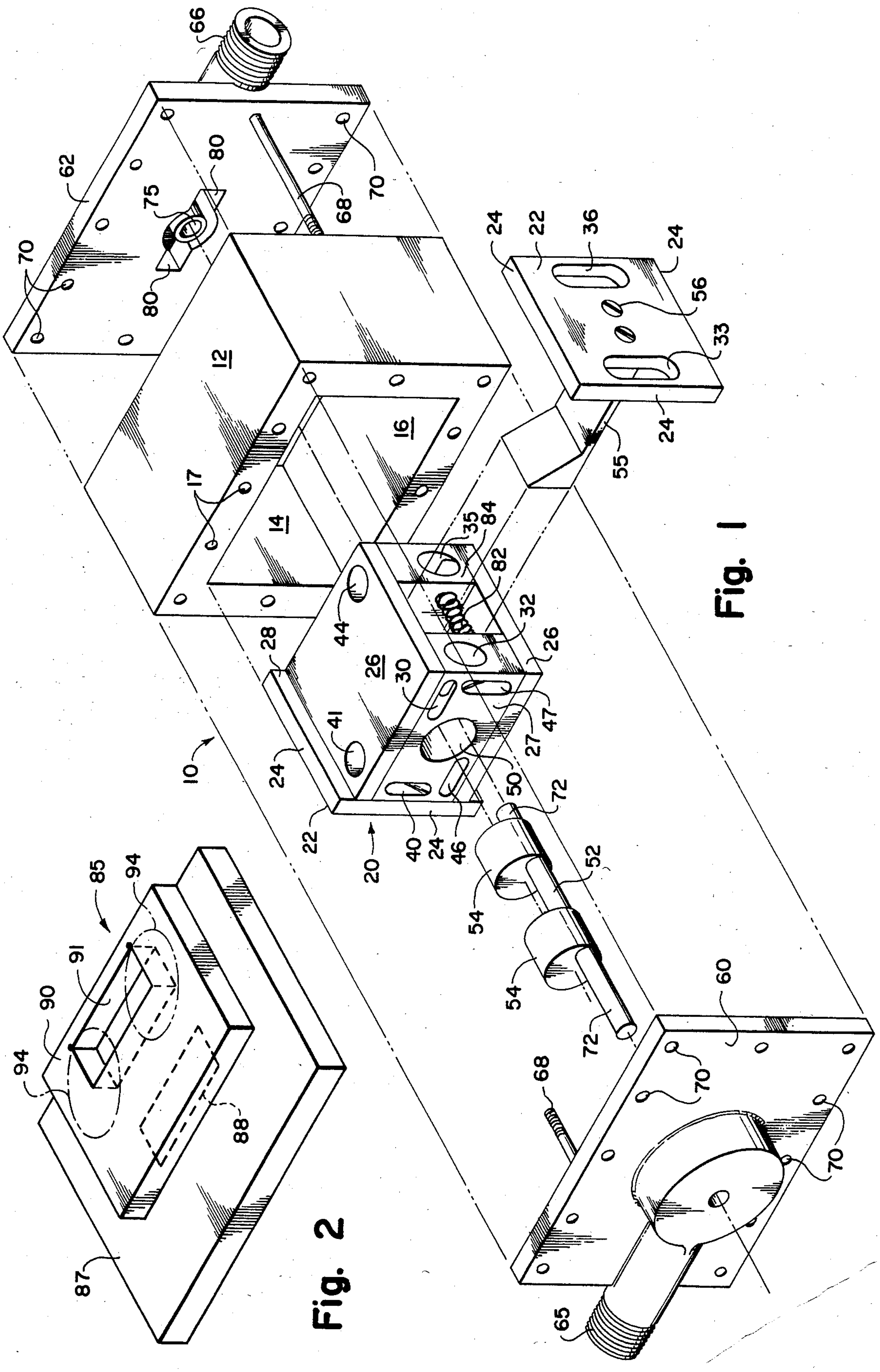
FIG. 1 is a perspective, exploded view of a pump device utilizing the nutating valving structure of the instant invention.
FIG. 2 is a simplified perspective view illustrating the nutation motion giving rise to the advantageous valving structure of the instant invention.

Turning now to the drawings, where elements of similar structure or function are designated by like reference numerals throughout the various figures, a pump structure utilizing the nutation valving arrangement of the instant invention is illustrated in FIG. 1 and generally designated by the reference numeral 10. Pump 10, which is chosen only for purposes of illustration as advantageously embodying the valving structure of the instant invention, includes central housing 12 having a rectilinear opening defined therethrough by opposed end walls 14 and top and bottom walls 16. A plurality of cylindrical openings 17 are defined therethrough. Piston assembly 20 is configured to fit within the opening defined in central housing 12.

It is to be understood that piston assembly 20, as well as the remainder of pump 10, includes symmetrical or mirror image structures such that illustration and description of the side and upper faces fully disclose and illustrate corresponding side and lower faces not shown in detail in the drawing. For instance, outer pistons 22 on opposed sides of piston assembly 20 are essentially identical though disposed in inverted relationship. Outer pistons 22 are adapted to reciprocate within the opening defined in central housing 12 with top and bottom faces 24 sealing against top and bottom wall 16 of central housing 12. Side faces 24 forming a sealing relationship as will be described in more detail below.

Inner pistons 26, positioned at the top and bottom of piston assembly 20, having faces 27 extending therebetween, as indicated in FIG. 1, to form an inner piston structure, and are movably disposed within the inner surface 28 of outer piston 22 such that inner piston 26 reciprocates up and down within outer pistons 22 as will be described in more detail below.

Four intake and four exhaust ports and openings, each of which comprise a nutation valving assembly in accord with the instant invention are illustrated. It will be understood that the particular structure of each of these arrangements is redundant in large part and accordingly only representative features will be described in detail. For instance, intake opening 30 communicates through intake port 32 with right side outer pistons 22 such that intake gases can flow through intake opening 30, to intake port 32 and into the varying volume defined by right outer piston 22 through elongated opening 33. Thus, as outer pistons 22, each of which have a similar structure, reciprocate in the opening defined at central housing 12, valve porting communicating with the varying volumes accordingly defined are provided. Similarly, elongated opening 36 defined as illustrated in right outer piston 22 provides an exhaust function which communicates in turn with exhaust port 35 connected to exhaust opening similar to that of intake opening 30 but positioned at the bottom of inner piston 26 rather than the top to provide appropriate timing. Similarly, inner piston 26 is provided, for example, with inlet opening 40 communicating with inlet port 41. Inlet port 41 merely opens at inner piston 26 since there is a static relationship while elongated openings 33 and 36 comprising inlet and exhaust openings respectively of right outer piston 22 are elongated since outer pistons 22 move relative to, for instance, inlet port 32 and exhaust port 35. Each of the two outer pistons 22 and inner piston 26 have an inlet and outlet opening and porting relationship. For instance, inlet opening 46 communicates with left outer piston 22 in a manner identical to that described with reference to inlet opening 30, while inlet opening 47 communicates with bottom inner piston 26 as described above with reference to inlet opening 40 relative to upper inner piston 26.

Piston assembly 20 includes an opening 50 defined centrally through and journalled to receive crank shaft 52, and particularly crank shaft eccentrics 54 at either end of inner pistons 26. Connector 55 serves to secure outer pistons 22 by means of fasteners 56 attached through each of outer pistons 22.

Identical inlet end plate 60 and outlet end plate 62 are adapted to fit tightly to central housing 12. Thus, when assembled, plates 60 and 62 fully enclose piston assembly 20 and provide side surfaces for the four pistons to bear upon and seal in conjunction with top and bottom wall 16 and end wall 14. Inlet end plate 60 includes an inlet pipe 65 while outlet plate 62 contains an identical outlet pipe 66. Though inlet pipe 65 and outlet pipe 66 are shown as facing an opposite direction, it is to be understood that with a very minor design change the otherwise identical end plates 60 and 62 could be arranged in mirror image fashion. Studs 68 are positioned in the corresponding portions of each of inlet plate 60 and outlet plate 66 at the portions including inlet pipe 65 and outlet pipe 66 respectively. In actual assembly, cross bolts and nuts (not shown) fit through openings 70 defined in end plates 60 and 62 and through opening 17 defined through central housing 12 such as to securely attach end plates 60 and 62 to central housing 12.

End journals 72 of crank shaft 52 are accomodated in bearings 75 shown in outlet end plate 62 but similarly provided in inlet end plate 60. Static openings 80, shown in outlet end plate 62 but again similarly located in inlet plate 60 are defined and communicate with outlet pipe 66 as shown, and with inlet pipe 65, such that the inlet and outlet ports defined in piston assembly 20 align with and move past static opening 80 to provide the valving action as will be described in more detail below.

Spring 82 between port blocks 84 serves to bias each port block 84 against adjacent end plate 60 and 62. Thus wear therebetween will be accomodated.

From the above description of pump 10 shown in FIG. 1, it will be apparent that, when assembled, outer pistons 24 will reciprocate laterally in the internal opening of central housing 12 as crankshaft 52 is rotated. Concurrently, inner pistons 26 will reciprocate vertically upon the inner surfaces 28 of the outer pistons 22 thus providing for, effectively, a four piston and four variable volume design. Further, the portion of inner pistons 26 in which the inlet and outlet openings 30, 40, 46 and 47, as well as the opposed exhaust openings (not shown) are defined will be driven by crank shaft 52 in a nutation movement, i.e., with each point on such side plates describing a circle of nutation but being confined from actually rotating. Accordingly, as crank shaft 52 rotates, and outer pistons 22 and inner pistons 26 reciprocate as described, the inlet and outlet openings will come into communication and be sealed from static opening 80 providing the nutating valving function. It is to be understood that such valving function though illustrated with reference to the pump structure of FIG. 1, can be generally applied and require only the elements illustrated in FIG. 2.

Accordingly, the structure of FIG. 1 is not to be viewed in any way as a particular structure necessary to the nutating valving, but only as a pump structure 10 illustrating the advantages of the instant invention with regard to simplicity and compactness. In actuality, the nutating valving arrangement may be utilized in conjunction with conventional reciprocating engines, with rotary engines or in any environment in which a timed valving function is desired.

Turning now to FIG. 2, nutating valving structure 85 is illustrated in which a nominally static plate 87 is illustrated having a static opening 88 defined therethrough while nutating plate 90 includes a nutating opening 91 defined therethrough. Each point on nutating plate 90 moves through circle of nutation 94 illustrated with reference to the end portions of nutating opening 91. Such movement minimizes the relative travel of the moving portion of the valving structure relative to the static structure, thereby permitting a longlasting sealing relationship therebetween. As is apparent, as nutating opening 91 aligns with static opening 88, flow therethrough may occur. As illustrated in FIG. 2, openings 88 and 91 are offset thus sealing against flow.

The operation and timing of various embodiments of valving structure 85 will be discussed with reference to FIGS. 3A through 3H, FIGS. 4A through 4F and FIGS. 5A through 5F in which the structural components will be identified with reference to FIG. 2.

Turning now to FIGS. 3A through 3H, a simplified version of the structure illustrated in FIG. 2 is illustrated with regard to static opening 88, nutating opening 91 and circles of nutation 94. Though not illustrated, it is to be understood that the basic relationship is as shown in FIG. 2 and relates to omitted structure such as static plate 87 and nutating plate 90.

Figures 3A, 3B, 3C, 3D, 3E, 3F, 3G, 3H:
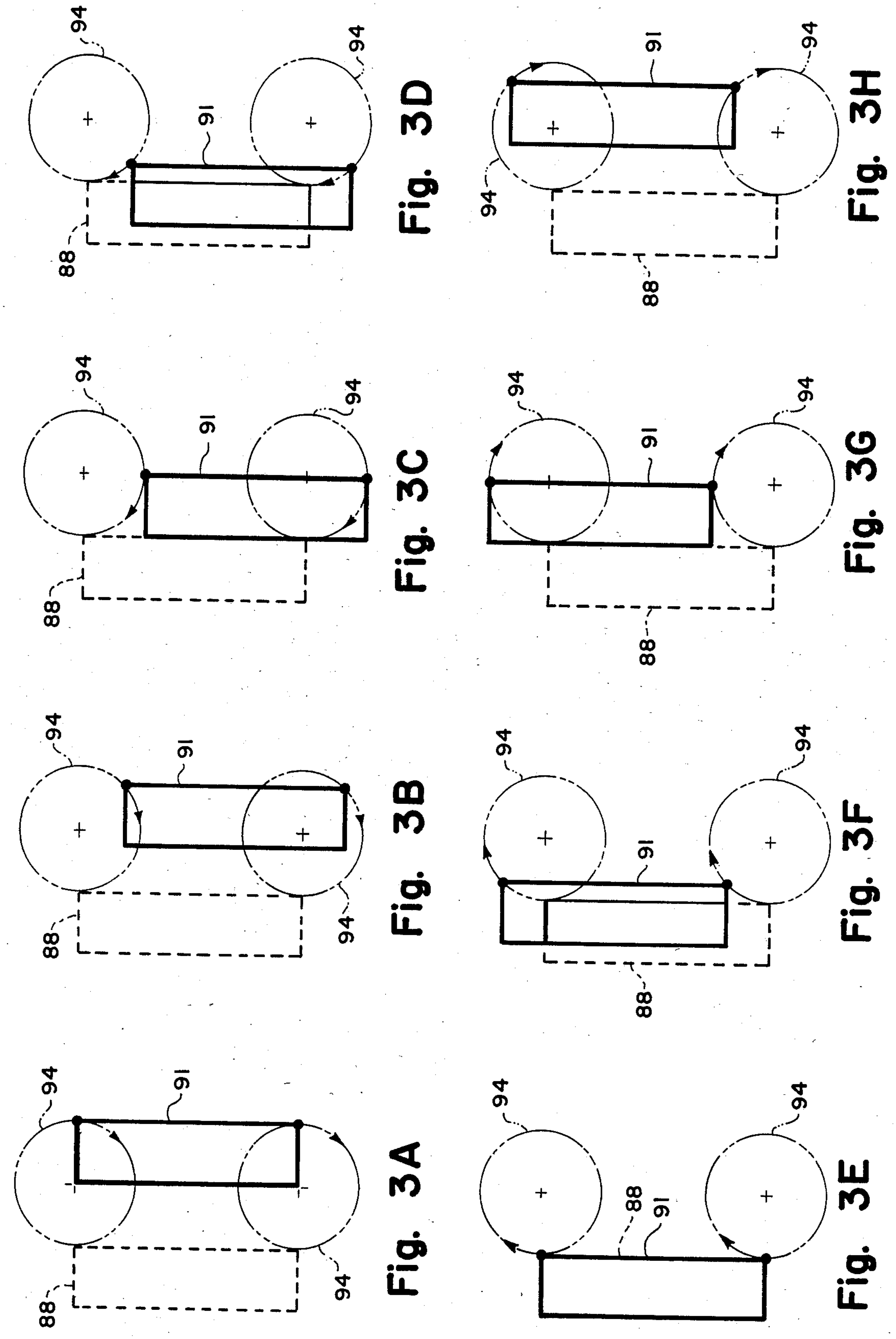
FIGS. 3A through 3H illustrate a timing relationship and geometry of a nutation valving structure in accord with the instant invention which opens and closes at bottom dead center and top dead center, respectively.

As shown in FIGS. 3A through 3H, a symmetrically timed, i.e. open for 180° and closed for 180° valving structure essentially identical to valving structure 85 of FIG. 2 is illustrated in a schematic, operational arrangement. Static opening 88 is illustrated as being of a dimension equal to that of nutating opening 91 and both are parallel to lines connecting the centers of circles of nutation 94. As shown in FIG. 3A, nutating opening 91 is in a sealed, closed relationship with regard to static opening 88 and maintains such "closed" relationship through the orientation shown in FIG. 3B depicting nutating opening 91 moving in a clockwise relationship towards static opening 88. At the 180° mark of circles of nutation 94 as shown in FIG. 3C, nutating opening 91 is reaching incipient overlap with static opening 88. As nutating opening 91 moves past the bottom dead center position of circles of nutation 94, alignment of opening 88 and 91 occurs thus permitting flow. At the 270° mark, as shown in FIG. 3E, full opening resulting in complete overlap of openings 88 and 91 occurs. Thereafter, closing is initiated, as shown in FIG. 3F, as nutating opening 91 moves toward the top dead center position vis-a-vis circles of nutation 94. Thereafter, at the top dead center or 0° mark, closing is accomplished as nutating opening 91 moves away from overlap with static opening 88. Thereafter, as shown in FIG. 3H, nutating opening 91 moves towards the position shown in FIG. 3A to repeat the cycle. Thus, in a full cycle the valving structure is closed for 180° of travel and open for 180° of travel with complete opening occuring at the 270° position as shown in FIG. 3E.

Figure 4C:
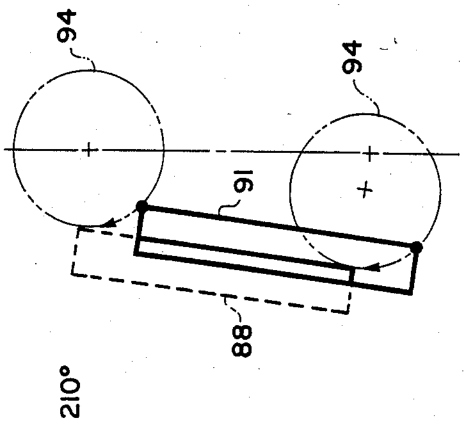
FIGS. 4A through 4F illustrate a timing and design relationship of a nutating valving structure in which the valve is opened for a short duration of a full cycle.
Figure 4B:
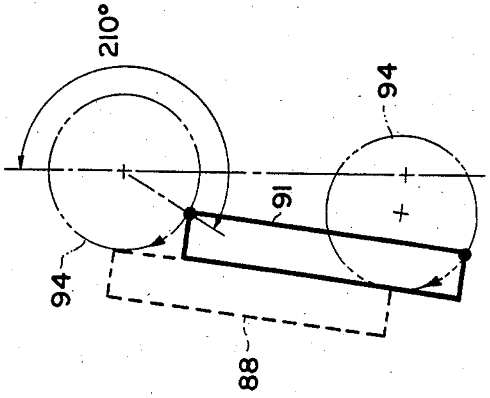
Figure 4F:
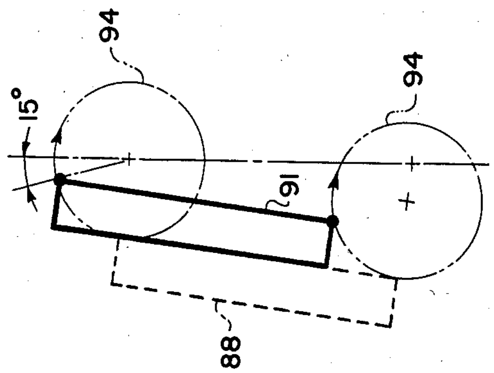
Figure 4E:
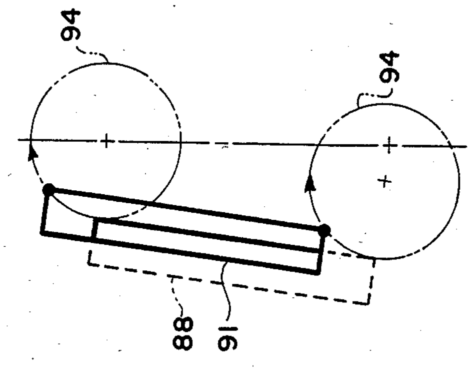
Figure 4D:
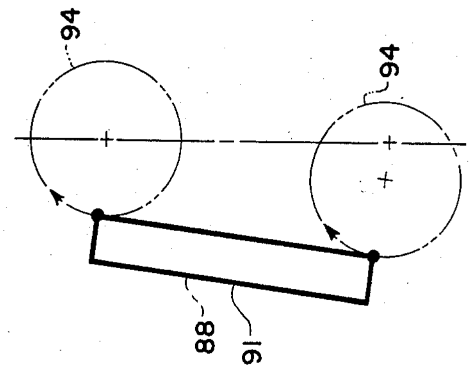
Figure 4A:
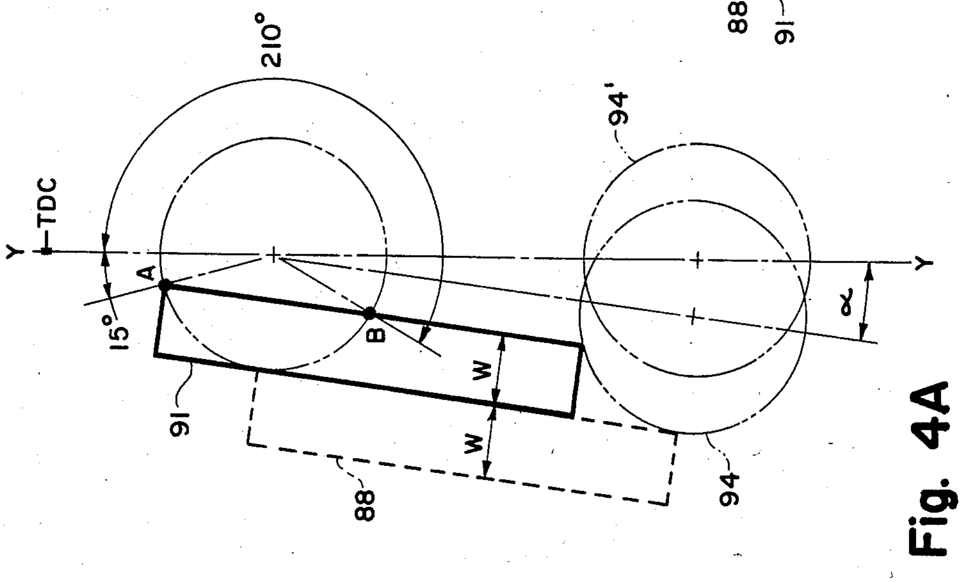

A method of designing and developing timing relationship is illustrated in FIGS. 4A through 4F wherein the static opening 88 and nutating opening 91 are again of similar size, configuration and dimensions. It is to be understood that the shape of such openings is yet another variable useful for providing, for instance, greater overlap at full openings, accelerated rates of opening, etc. but for purposes of illustration these parameters are held constant. With reference to FIG. 4A, it will be noted that points A and B, the closing and opening points respectively of the desired timing configuration are plotted. Point A is 15° before top dead center while point B is 30° past bottom dead center. The right edge of nutating opening 91 is then aligned as shown through such points. It is to be understood of course that similar circles of nutation 94 exsist for all points on nutating opening 91 and that other edges may be readily used for any construction as will be apparent to those skilled in the art. Static opening 88 is then positioned in the closed position, i.e. overlap of the leading edge of static opening 88 and the trailing edge of nutating opening 91. For purposes of illustration, it will be noted that circle of nutation 94, which would constitute the 180° timing illustrated with reference to FIGS. 3A through 3H, is spaced from lower circle of nutation 94' developed by the construction with the angle α therebetween being the angle through which the orientation of the openings 88 and 91 are rotated from the above discussed symmetrical timing arrangement.

In operation, as shown in FIG. 4B, opening of the valving device occurs at 210° past top dead center as the openings 88 and 91 align in an incipient overlap position. Thus, as shown in FIG. 4C, when nutating opening 91 moves into the overlap position with static opening 88, flow is permitted. Complete opening occurs as shown in FIG. 4D with overlap of static opening 88 and nutating opening 91. In a manner similar to that discussed with reference to FIGS. 3A through 3H, nutating opening 91 moves towards the closed position, as shown in FIG. 4E until closing is completed as shown in FIG. 4F at 15° before top dead center, i.e. the selected design point. It is to be understood that the width W of nutating opening 91 is determined by positioning the left edge thereof tangent to upper circle of nutation 94 in the manner shown. Accordingly, the widths W of openings 88 and 91, which are by definition equal, differ for a fixed circle of nutation from that of symmetrically timed device shown in FIGS. 3A through 3H.

Figures 5A, 5B, 5C, 5D, 5E, 5F:
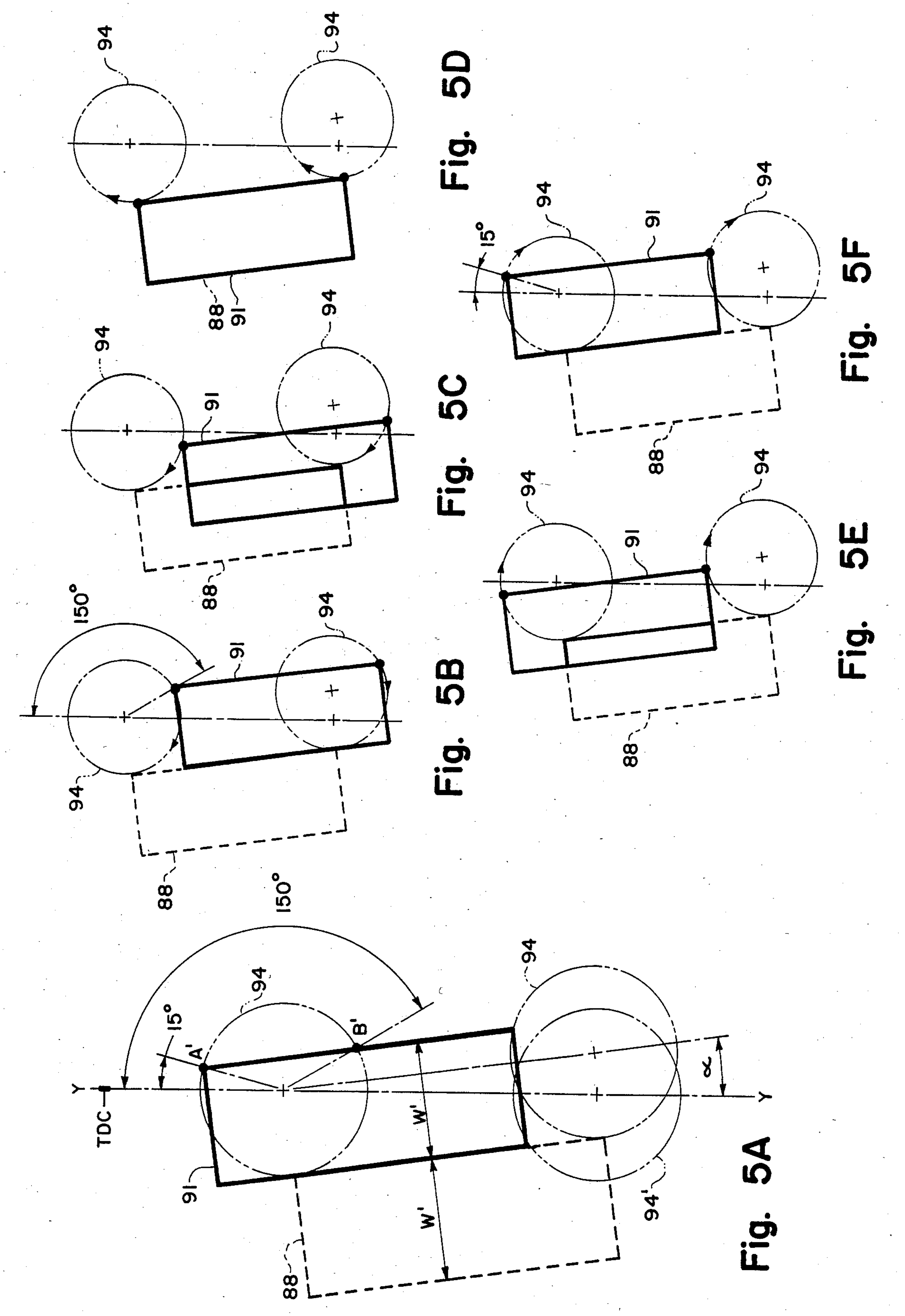
FIGS. 5A through 5F illustrate an arrangement similar to that of FIGS. 4A through 4F with a long duration design.

In the event a long duration valving device is desired, a similar construction may be accomplished as shown in FIGS. 5A through 5F. With reference to 5A, it will be noted that point A', i.e. the closing point with reference to a clockwise rotating device, is constructed on upper circle of nutation 94 while point B, the closing point is constructed on circle of nutation 94 at the selected closing and opening points, i.e. 15° past top dead center and 150° past top dead center respectively. Nutating opening 1 again is of a width W', this time a larger relative dimension, such that the right edge thereof passes through points A' and B' while the left edge is tangent to upper circle of nutation 94. As shown in FIG. 4A, but discussed in more detail here, static opening 88 is positioned with a width and length identical of that of nutating opening 91, with the right edge thereof aligned with the left edge of nutating opening 91 as shown in FIG. 5A, and with the upper surface of upper edge of static opening 88 positioned at the tangent point of the left edge of nutating opening 91 to upper circle of nutation 94. Accordingly, the desired timing may be accomplished and the location of openings 88 and 91 precisely determined using essentially identical procedures in FIGS. 4A and 5A. However, as will be noted, this time lower circle of nutation 94 is offset to the right from circle of nutation 94', which would constitute a symmetrical timing arrangement as shown in FIG. 3A. It should be noted that with W' of openings 88 and 91 is relatively larger in the long duration device illustrated in FIG. 5A. In operation, as shown in FIG. 5B, nutating opening 91 is at the incipient opening position, i.e. 150° past top dead center of circle of nutation 94. Upon further rotation as shown in FIG. 5C, overlap of nutating opening 91 and static opening 88 occurs thereby permitting flow. Full opening is accomplished, as shown in FIG. 5D, at the position, with reference to FIG. 5A, in which the left edge of nutating opening 91 is tangent to upper circle of nutation 94 at the closed position.

Again in a manner discussed similar to that discussed above, nutating opening 91 moves past the full opening position, as shown in FIG. 5E to the closed position as shown in FIG. 5F, i.e. at 15° beyond top dead center. It should be recognized that in the arrangement shown in FIGS. 5A through 5F, which is specified according to the construction shown in FIG. 5A, the device would be closed for 150° of rotation relative to circle of nutation 94 while being opened for 210° of such rotation.

In summary, it will be recognized that the nutation valving arrangement of the present invention involves at least two of often conveniently three plates at least one of which has defined therethrough an opening and nutates relative to the remaining plate. Various timing, rate of opening and other parameters may be conveniently designed into the arrangement. Such parameters are essentially independent of piston timing or position. A nutating opening overlaps and moves away from static opening thereby providing a valving arrangement having low relative velocity and movement between the plates containing the openings. Conveniently, the plates may be biassed towards one another thereby taking up wear between the plates and maintaining an extremely long lasting and effective sealing relationship. Though of particular advantage with reference to devices having intrinsically nutating surfaces, such as the pump described above, it is to be understood that the plates could be driven through the nutating relationship to provide, for instance, valving for normal reciprocating pistons. Such valving can readily be provided for four stroke designs.

Though only limited embodiments and examples of the instant invention and method of operation thereof had been specifically illustrated and described in order to provide preferred illustrations, it is to be understood that the invention involves structures and procedures as will be apparent to those skilled in the art and limited only by the following claims.

What is claimed is:

1. A nutation valving apparatus comprising:

at least one fixed plate having at least one opening defined therein with opening being located in the face of said fixed plate and having leading and trailing linearly extending wall portions;

at least one nutating plate mounted to nutate around a circle of nutation of a given dimension, the nutating plate having at least one opening defined therein, with said opening being located in the face of said nutating plate and having leading and trailing linearly extending wall portions, and with the opening defined in the nutating plate and the opening defined in the fixed plate arranged so that the leading and trailing linearly extending wall portions of the openings in the nutating and fixed plates are maintained substantially parallel to one another during relative movement between the plates to bring said openings into an overlapping relationship during a portion of the nutation movement of the nutating plate and causing said plates to be spaced apart during a different portion of the nutation movement of the nutating plate; and means to drive the nutating plate through a nutating motion;

whereby valving may be accomplished by selectively configuring the fixed plate and nutating plate to provide for opening of the valving apparatus to permit flow during overlap of the fixed plate and the nutating plate openings and closing of the valving apparatus to preclude flow during periods when the fixed plate and the nutating plate openings are spaced apart in a nonoverlapping relationship during the nutation movement.

2. A nutating valving apparatus as set forth in claim 1 in which one nutating plate is positioned between two immediately adjacent fixed plates on either side of the nutating plates with the openings in the fixed plate being aligned with one another.

3. A nutating valving apparatus as set forth in claim 1 in which one fixed plate is positioned between two immediately adjacent nutating plates, on either side of the fixed plate with the openings in the nutating plates being aligned with one another and the nutating plates being driven together.

4. A nutating valving apparatus as set forth in claim 1 in which the fixed plate and nutating plate are resiliently biassed one towards the other, whereby wear between the plates is accomodated and a sealing relationship between the plates maintained.

5. A nutating valving apparatus as set forth in claim 1 in which the openings in the fixed plate and nutating plate are rectilinear in configuration.

6. A nutating valving apparatus as set forth in claim 5 in which the openings in the fixed plate and nutating plate are of the same shape and size and positioned to fully overlap during at one position of the nutating movement of the nutating plate.

7. A nutating valving apparatus as set forth in claim 1 in which the openings of the fixed plate and nutating plate at least partially overlap at least in part for no more than 180° of the nutating motion of the nutating plate.

8. A nutating valving apparatus as set forth in claim 1 in which the openings of the fixed plate and nutating plate overlap at least in part for at least 180° of the nutating motion of the nutating plate.

9. A nutating valving apparatus as set forth in claim 1 in which the nutating motion of the nutating plate is in timed relationship to a rotating crank shaft.

10. A method of operating a nutating valving apparatus with a fixed plate having an opening defined therein with said opening being located in the face of said fixed plate and having leading and trailing linearly extending wall portions, and an adjacent nutating plate having at least one opening defined therein, with said opening in said nutating plate being located in the face of the nutating plate and having leading and trailing linearly extending wall portions, the method comprising:

opening the valving apparatus by moving each point of the nutating plate through a circle of nutation to move the opening in the nutating plate toward the opening in the fixed plate with the leading wall portions of said openings being maintained substantially parallel to one another so that the opening in the nutating plate at least partially overlaps the opening defined in the fixed plate;

flowing a fluid substance through the overlapped openings; and closing the valving apparatus by continuing motion of the nutating plate with the trailing edges of the openings in the nutating plate and fixed plate being maintained substantially parallel to one another to position the opening in the nutating plate in a spaced, nonoverlapping relationship to the opening in the fixed plate, whereby fluid flow is terminated by the sealing relationship of the fixed plate and nutating plate.

11. A method of operating a nutating valving apparatus as set forth in claim 10 in which the nutating plate and fixed plate are urged together by biassing means to maintain a sealing relationship between the adjacent surfaces of the fixed plate and nutating plate.

12. A method of timing a nutating valving apparatus including a fixed plate having a rectilinear opening with leading and trailing edges defined therethrough and a nutating plate having at least one similar rectilinear opening defined therethrough, the nutating plate nutating through a circle of nutation of a given dimension, the method comprising:

locating the trailing edge of the nutating plate opening along the line define by the opening and closing positions on a circle of nutation;

positioning the leading edge of the nutating plate opening substantially parallel to the trailing edge and tangent to the circle of nutation; and positioning the opening in the fixed plate with one edge aligned with the leading edge of the opening in the nutating plate when the trailing edge is aligned with identified points on the circle of nutation and further positioned to fully overlap the nutating plate opening when the trailing edge of the opening of the nutating plate is positioned at the leading edge position at such time as the trailing edge passes through the identified points on the circle of nutation during continuous motion of the nutating plate.

* * * * *